Patented Nov. 16, 1937

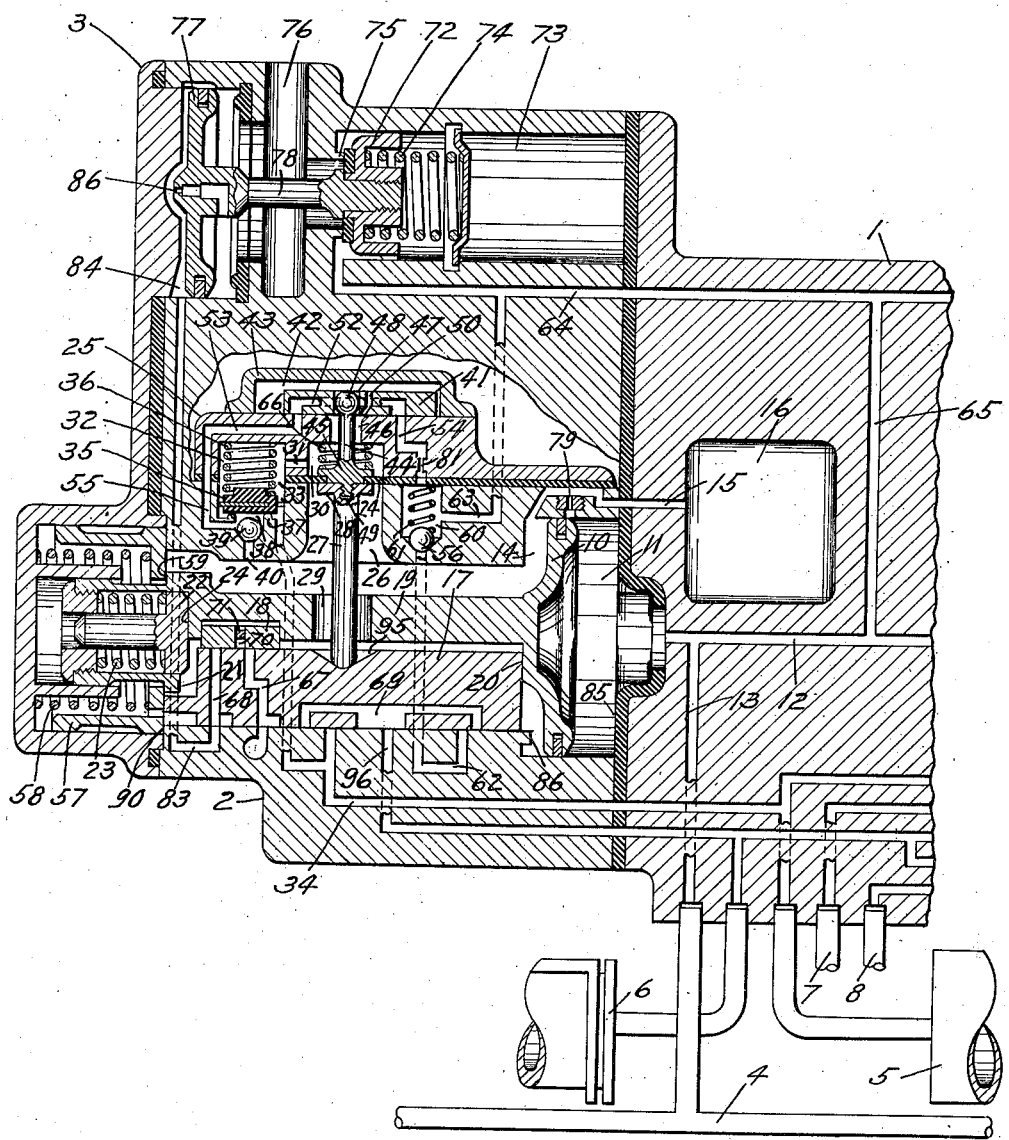

2,099,392

UNITED STATES PATENT OFFICE 2,099,392

FLUID PRESSURE BRAKE

John N. Good, Wilmerding, Pa., assignor to The Westinghouse Air Brake Company, Wilmerding, Pa., a corporation of Pennsylvania Application August 27, 1936, Serial No. 98,135

17 Claims. (Cl. 303—42)

This invention relates to fluid pressure brakes and more particularly to the type adapted to operate upon a reduction in brake pipe pressure to effect an application of the brakes and upon an increase in brake pipe pressure to effect a release of the brakes.

In Patent 2,031,213 issued to Clyde C. Farmer on February 18, 1936, there is disclosed a fluid pressure brake equipment embodying a brake controlling valve device which includes a service valve device adapted to operate upon a service rate of reduction in brake pipe pressure to effect a service application of the brakes, and an emergency valve device adapted to operate along with the service valve device upon an emergency rate of reduction in brake pipe pressure to effect an emergency application of the brakes.

The emergency valve device comprises a piston subject to the opposing pressures of the brake pipe and a quick action chamber, and a main slide valve and an auxiliary slide valve adapted to be operated by said piston. The piston is adapted to respond to a service rate of reduction in brake pipe pressure and move the auxiliary slide valve relative to the main slide valve to a service position in which a communication is established through which the pressure of fluid in the quick action chamber is adapted to be reduced at a service rate, which corresponds to the rate of reduction in brake pipe pressure, in order to prevent sufficient differential from being developed between the brake pipe and quick action chamber pressures to move said piston and auxiliary slide valve past service position. This communication is so restricted however, that the pressure of fluid in the quick action chamber can not reduce as fast as the brake pipe pressure reduces upon an emergency rate of reduction in brake pipe pressure, so that upon an emergency rate of reduction, a sufficient differential of pressures is built up on said piston to operate said piston to move the auxiliary slide valve past service position to an emergency position in which fluid under pressure is supplied from said quick action chamber to effect the operation of a brake pipe vent valve device to suddenly vent the fluid under pressure from the brake pipe for initiating serial quick action through the train. This sudden venting of fluid from the brake pipe also promptly establishes sufficient differential of pressures on the emergency piston to operate same to move the main slide valve to a position for supplying fluid under pressure to the brake cylinder for applying the brakes on the vehicle.

The emergency piston is adapted to move the auxiliary slide valve to the service position when a relatively small differential of pressures, such as .4 of a pound, is obtained thereon. In order to stabilize said piston against possible undesired movement thereof and of the auxiliary slide valve past the service position to the emergency position upon a service reduction in brake pipe pressure, a spring is provided which comes into action to oppose further movement of said piston at substantially the time the quick action chamber vent communication is opened in service position. This spring is designed to require an increase of for instance .5 of a pound in the differential of pressures on the emergency piston in order that said piston may move past the service position and into the emergency position, but the venting of fluid under pressure from the quick action chamber in the service position is adapted to so reduce the pressure in said chamber that said increase in differential will not be obtained upon a service rate of reduction in brake pipe pressure.

It is possible that the static resistance to movement of the emergency piston may become so increased, due for instance to slight accumulations of foreign matter on the piston or piston cylinder wall, that a differential of pressures greater than the .4 of a pound above mentioned will be required to start said piston moving. If this static resistance becomes sufficiently great, there is then a possibility that the differential of pressures required to start the piston moving will be so great, that after the piston starts the rapidity of its movement due to the high differential of pressures acting thereon and the inertia of the moving parts may be such that the spring for opposing movement past service position will be promptly overcome and there will be insufficient time of opening of the quick action chamber vent communication as the piston moves the auxiliary slide valve through service position to effect any appreciable reduction in pressure in said chamber, so that the differential of pressures on the emergency piston will be maintained sufficient to move said piston and the auxiliary slide valve to the emergency position and thereby initiate an emergency application of the brakes on the train.

It is undesirable to have an emergency application of the brakes occur upon a service rate of reduction in brake pipe pressure since such an application will generally bring a train to a stop and thereby interfere with the operating schedule thereof, and further because an emergency application of the brakes is liable to result in damage to cars in the train or to the lading carried thereby.

One object of my invention is to provide an emergency valve device having improved means adapted to prevent undesired emergency operation thereof under conditions such as above described.

In the emergency valve device disclosed in the aforementioned patent, the movements of the piston and auxiliary slide valve from their normal position to the service position and then to the emergency position are very slight, for instance there is only about .060" movement from the normal position to start opening the service vent communication. The spring for opposing movement of the piston past service position becomes effective after about .010" further movement. The service vent communication is fully opened upon about .020" further movement, while another .020" further movement starts opening the emergency port which is fully opened in the emergency position. It will be evident that in the manufacture of these parts extreme accuracy is required in order to ensure the properly timed operation of the various parts of the device, and another object of the invention is to provide an improved emergency valve device in which this extreme accuracy of manufacture is not required for obtaining the desired operation thereof.

There are a large number of brake controlling valve devices of the type disclosed in the aforementioned patent in use, and another object of the invention is to provide means whereby relatively unskilled workmen in the field may modify such devices so as to embody therein means adapted to avoid the possibility of their operating upon a service rate of reduction in brake pipe pressure to effect an undesired emeregency application of the brakes.

Other objects and advantages will be apparent from the following more detailed description of the invention.

In the accompanying drawing, the single figure is a diagrammatic view of a portion of a fluid pressure brake equipment embodying the invention.

The portion of the fluid pressure brake equipment shown in the drawing is similar to the emergency portion of the equipment disclosed in the aforementioned Farmer patent, but only those parts are shown which are deemed essential to a clear understanding of the invention.

The portion of the fluid pressure brake equipment shown in the drawing comprises a pipe bracket 1 upon one face of which is mounted an emergency valve device 2 and a brake pipe vent valve device 3, said bracket having another and opposite face (not shown) upon which there is adapted to be mounted a service valve device (not shown) which however forms no part of the invention. Connected to the pipe bracket 1 is a brake pipe 4, an emergency reservoir 5, a brake cylinder 6 and pipes 7 and 8 one of which is adapted to be connected to the usual auxiliary reservoir (not shown) and the other of which is adapted to be connected to the usual brake cylinder pressure retaining valve device (not shown).

The emergency valve device 2 comprises a casing containing a piston 10 having at one side a chamber 11 in constant communication with brake pipe 4 through passages 12 and 13 and having at the opposite side a valve chamber 14 in constant communication through a passage 15 with a quick action chamber 16.

A main slide valve 17 and an auxiliary slide valve 18 mounted on and adapted to be moved relative to the main slide valve are disposed in valve chamber 14. The piston 10 is provided with a stem 19 extending through chamber 14 with its outer end slidably mounted in a suitable bore in the casing. The stem 19 has a cavity in which the auxiliary slide valve 18 is disposed so as to be moved with the piston 10, while the main slide valve 17 is disposed between a shoulder 20 on the piston and shoulder 21 on the piston stem through the medium of which the main slide valve 17 is adapted to be operated by said piston.

A plunger 22 is slidably mounted in the left hand end of the piston stem 17 in operating alignment with the left hand end of the slide valve 17. A spring 23 in the stem 19 acts on the plunger 22 urging same to its normal position against a shoulder 24 formed in the stem and in this position the end of the plunger is spaced forward towards the piston a slight distance from the shoulder 21.

A plunger 57 is slidably mounted in the casing and is normally urged into engagement with a shoulder 90 thereof by a spring 58. The plunger 57 is provided with a central aperture through which the piston stem 19 freely extends and said stem is provided with a shoulder 59 adapted to engage said plunger, whereby the spring 58 acting on the plunger will oppose movement of the piston 10 and thereby the slide valves 17 and 18 from their normal position, shown in the drawing, towards the left hand to a back dump position which will be hereinafter described.

A gasket having a flexible diaphragm 24 forming a part thereof is clamped between the casing and a cover plate 25. One face of this diaphragm is open to a bore 26 leading to valve chamber 14. A rocking stem 27 having an enlarged head portion 28 engaging the lower face of diaphragm 24 extends through the bore 26 into chamber 14 and from thence through an opening 29 in the piston stem 19 and into a recess 95 formed in the upper face of the main slide valve 17, and in this recess said stem engages the main slide valve so that the lower end of the stem will move with said slide valve.

The cover 25 has a chamber 30 at the opposite face of diaphragm 24 which is open through a passage 31 to a chamber 32 in said cover, the chamber 32 registering with a cavity 33 which is provided in the emergency valve casing and which is in constant communication with the emergency reservoir 5 through a passage 34. The cavity 33 contains a check valve 35 and a spring 36 acting on said check valve urging same into engagement with a seat rib 37 for closing communication from chamber 33 to a chamber 38. The chamber 38 contains a check valve 39 adapted to close communication from said chamber to a passage 40 which leads to valve chamber 14.

A back dump check valve 56 is disposed in a chamber 60 in the casing of the emergency valve device, and a spring 61 in said chamber acts on said check valve to urge same to its seated position for closing communication from said chamber to a passage 62 which leads to the seat of the main slide valve 17. The chamber 60 is in constant communication with brake pipe 4 through passages 63, 64, 65, 12, and 13.

The cover 25 is a special cover adapted to be employed on the emergency valve devices now in use in place of the covers with which said devices were originally provided, the original covers being of the design disclosed in the Farmer patent hereinbefore referred to. The chambers 30 and 32 and the passage 31 in the cover 25 correspond to like chambers and passage provided in the original covers.

According to the invention the cover 25 is provided with a slide valve seat on the face opposite diaphragm 24, and a slide valve 41 is mounted on this seat and is enclosed in a chamber 42 formed in a cap 43 which is secured over said slide valve to the cover 25.

An element 44 in the form of a finger like extension of the rocking pin 27 is provided for moving the slide valve 41 on its seat. This element has at one end an enlarged head or follower 45 engaging the diaphragm 24 and secured to the rocking pin 27 by a stud 49 having screw threaded engagement therewith whereby said element is adapted to be moved with said rocking pin.

The element extends through chamber 30 and an opening 46 leading from said chamber to the seat of the slide valve 41, and into an opening 47 in said slide valve wherein the end of said element is provided with a ball like head 48 engaging said slide valve within the opening 47.

The slide valve 41 is provided with a port 52 adapted in the normal position of said slide valve to establish communication between passages 53 and 54 in the cover 25. The passage 53 leads to a passage 55 which, according to the invention is provided in the emergency valve casing to establish communication from passage 53 in the cover to the check valve chamber 38. The passage 54 merely leads to the back dump check valve chamber 60 in the emergency valve device. A port 50 through the slide valve 41 establishes a constantly open communication between the chamber 42 and the opening 46 which leads to the chamber 30 wherein there is disposed the usual spring 66 which acts on the follower 45 through which the pressure of said spring is transmitted to the rocking pin 27 and from thence to the main slide valve 17 for reasons described in the aforementioned patent.

The main slide valve 17 of the emergency valve device has a service port 67, an emergency port 68 and a cavity 69 the purpose of which will be hereinafter described, while the auxiliary slide valve 18, which is adapted to control the emergency port 68 and service port 67, is provided with a service port 70 adapted in the service position thereof to register with the service port 67. According to the invention however, the service port 70 is closed by a plug 71 which eliminates from the emergency slide valves 18 and 17 the service function of venting fluid under pressure from the quick action chamber at a service rate upon a service rate of reduction in brake pipe pressure in order to prevent movement of the piston 10 and auxiliary slide valve 18 to their emergency position, in the manner described in the aforementioned patent.

The brake pipe vent valve device 3 is the same as disclosed in the patent hereinbefore referred to and comprises a vent valve 72 contained in a chamber 73 which is in constant communication with brake pipe 4 through passages 64, 65, 12, and 13. A spring 74 is provided in chamber 73 and acts on the vent valve for urging same into engagement with a seat rib 75 so as to close communication from chamber 73 to a chamber 76 which is open to the atmosphere. The vent valve device further comprises a piston 77 for unseating the vent valve 73 and connected thereto by a stem 78.

In operation, in order to charge the equipment with fluid under pressure, fluid under pressure supplied to brake pipe 4 in the usual well known manner flows from said brake pipe through passages 13 and 12 to emergency piston chamber 11. With the emergency piston 10 in its normal position, as shown in the drawing, fluid under pressure supplied to chamber 11 flows through a restricted charging port 79 to passage 15 and from thence in one direction to the emergency valve chamber 14 and in the opposite direction to the quick action chamber 16 thereby charging said chambers with fluid at the pressure in the brake pipe.

Fluid under pressure supplied to passage 12 is adapted to flow in a direction towards the right hand to the service portion (not shown) of the equipment which is adapted to be operated thereby to supply fluid under pressure to the emergency reservoir 5 for charging same and to release fluid under pressure from the brake cylinder 6 in the manner described in the aforementioned patent, but neither of these functions are pertinent to the invention.

Fluid under pressure supplied to passage 12 also flows from said passage to passage 65 and from thence through passage 64 to the vent valve chamber 73 and to passage 63. From passage 63 fluid under pressure flows into the back dump check valve chamber 60. The check valve 56 is seated at this time which prevents flow of fluid to passage 62, so that fluid under pressure supplied from the brake pipe to chamber 60 can only flow into passage 54 and from thence through port 52 in slide valve 41 to passage 53 and through said passage and passage 55 to check valve chamber 38.

Fluid under pressure obtained in the emergency reservoir 5 is supplied through passage 34 to the seat of the emergency main slide valve 17 and also to the check valve chamber 33 from whence it flows through passage 31 to chamber 30 in which it acts on the diaphragm 24. Fluid under pressure supplied to chamber 30 also flows through the opening 46 and port 50 in the slide valve 41 to chamber 42 wherein the pressure of fluid acts on the slide valve 41 to hold said slide valve seated at all times against the pressure of fluid supplied from the brake pipe 4 to passages 54 and 53 and acting on the seating face of said slide valve tending to blow said slide valve from its seat.

If the pressure of fluid supplied to check valve chamber 38 becomes sufficient to overcome the opposing pressures of the spring 36 and emergency reservoir pressure acting in chamber 33 on the check valve 35, said check valve is unseated and fluid under pressure then flows from the brake pipe to chamber 33 and from thence to the emergency reservoir 5 which aids in charging said reservoir.

A restriction in the form of a choke 81 is placed in passage 54 for the purpose of retarding the flow of fluid under pressure from the brake pipe to the seat of the slide valve 41 and to check valve chamber 38 in charging the equipment and for also retarding flow of fluid under pressure in the reverse direction in effecting a service application of the brakes as will be hereinafter described.

By retarding the flow of fluid from the brake pipe through passage 54 to the seat of slide valve 41 in charging the equipment, the pressure of fluid obtained in passages 54 and 53 and acting to unseat the slide valve 41 will never increase above emergency reservoir pressure in chamber 42 acting to seat said slide valve an amount greater than the relatively light biasing pressure of spring 36 acting on the check valve 35, since when the pressure obtained in said passages acting to unseat the slide valve is increased sufficiently to unseat the check valve 35, fluid under pressure will then flow from said passages past said check valve to chamber 33 and then with fluid under pressure from the emergency reservoir 5 will flow to the valve chamber 42 so that the pressure in valve chamber 42 will increase or build up substantially with that in said passages.

In charging a train it is customary to initially increase the brake pipe pressure at the head end of a train rapidly and to a degree higher than that normally carried so that in a brake equipment at the head end of a train it is possible that the pressure in valve chamber 14 and quick action chamber 16 may tend to become increased to a degree higher than normally carried. This however is prevented, since when the pressure in these chambers is built up to a degree slightly exceeding that in the emergency reservoir 5 the check valve 39 is unseated which permits the excess fluid to spill over from said chamber to check valve chamber 38 and then flow along with the fluid supplied through passage 55 past the check valve 35 to the emergency reservoir 5. The emergency reservoir is of relatively large volume and thus able to absorb any excess of fluid under pressure which might be obtained in the valve chamber 14 and quick action chamber 16 during the charging of the equipment.

It will be evident that the action of choke 81 to limit the flow of fluid under pressure and thereby the pressure build up in check valve chamber 38 is essential to permit the spill over of fluid under pressure from the valve chamber 14 and quick action chamber 16 to the emergency reservoir 5, for if the choke 81 were not employed, then the pressure in chamber 38 might build up equal to that in the brake pipe in which case any excess of pressure obtained in chamber 14 could not unseat the check valve 39 and be dissipated as above described.

In order to effect a service application of the brakes, a service rate of reduction in pressure is effected in the brake pipe 4 and consequently in the emergency piston chamber 11 and in check valve chamber 38. When the pressure in chamber 38 is thus reduced slightly below that in the emergency valve chamber 14 and quick action chamber 16, the pressure in valve chamber 14 unseats the check valve 39 and fluid under pressure then flows from chambers 14 and 16 back to the brake pipe 4 by way of chamber 38, through passages 55 and 53, port 52 in the slide valve 41, passage 54, choke 81, back dump check valve chamber 60 and from thence through passages 63, 64, 65, 12, and 13 to brake pipe 4. The choke 81 permits the pressure in chambers 14 and 16 to thus reduce back into the brake pipe at a service rate which corresponds to the rate of reduction in brake pipe pressure and thus prevents a sufficient differential of pressures from being developed on piston 10 to normally move said piston out of its normal position.

If the static resistance to movement of the piston 10 is less than normal, said piston may be moved by the slight differential of pressures obtained thereon upon a service rate of reduction in brake pipe pressure, but this is not objectionable, since when the plunger 22 engages the end of the main slide valve 17, the pressure of spring 23 will prevent further movement of said piston and it will be noted that in case of such movement the service port 70 will be moved into registry with port 67 but due to the port 70 being closed by plug 71 there will be no service venting of fluid under pressure from chambers 14 and 16 through these ports as occurs in the emergency valve device disclosed in the aforementioned Farmer patent.

The choke 81 is of insufficient size to permit the pressure in valve chamber 14 and quick action chamber 16 to reduce back into the brake pipe 4 as fast as the brake pipe pressure reduces upon an emergency rate of reduction, so that upon an emergency rate of reduction in brake pipe pressure, a differential of pressures is built up on the emergency piston 10.

When this differential becomes sufficient, the piston 10 is first moved towards the right hand until plunger 22 engages the left hand end of the main slide valve 17. Then as the differential of pressures as the piston is increased, the spring 23 acting on the plunger 22 is overcome and the piston moves further towards the right hand and in so doing moves the auxiliary slide valve 18 to its emergency position in which port 68 is opened to valve chamber 14.

Fluid under pressure is then supplied from valve chamber 14 and quick action chamber 16 to port 69 through which it flows to passage 83 and from thence to chamber 84 at the left hand face of the vent valve piston 77.

The pressure of fluid thus obtained on piston 77 promptly shifts said piston towards the right hand and unseats the vent valve 72 which permits a sudden emergency venting of fluid under pressure from brake pipe 4 by way of passages 13, 12, 65, 64, 63, chamber 73, past the vent valve 72 to chamber 76 and from thence to the atmosphere. This sudden venting of fluid under pressure from the brake pipe is for the purpose of transmitting emergency action serially through a train in the usual well known manner and it also provides a sufficient reduction in pressure in the emergency piston chamber 11 below the opposing pressure in valve chamber 14 to promptly move the piston 10 into engagement with a gasket 85.

This movement of piston 10 moves the main slide valve 17 to a position in which the cavity 69 connects the emergency reservoir passage 34 to passage 96 leading to the brake cylinder 6, and through this communication fluid under pressure in the emergency reservoir 5 is permitted to equalize into said brake cylinder for providing high emergency brake cylinder pressure and thereby an emergency application of the brakes.

With the slide valve 17 in the position just described, the passage 83 is uncovered by slide valve 17 and opened directly to valve chamber 14 so that fluid under pressure from chambers 14 and 16 continues to be supplied to the vent valve piston chamber 84 to thereby maintain the piston 77 and vent valve 72 in the brake pipe venting position. The fluid under pressure thus supplied to chamber 84 is gradually vented through a port 86 to chamber 76 and thus to the atmosphere. The port 86 is so proportioned to the volume of the chambers 14 and 16 that sufficient pressure will be maintained on said piston to hold the vent valve 72 unseated for a sufficient period of time to ensure substantially complete venting of fluid under pressure from the brake pipe 4, after which, the pressure of spring 74 is permitted to seat the vent valve 72 so that the brake equipment may be recharged to effect a release of the brakes, whenever it is so desired.

When the main slide valve 17 is moved to the position just described, its moving acts through the rocking pin 27 and the extension 44 thereof to shift the slide valve 41 towards the left hand to a position in which communication between passages 53 and 54 through port 52 is closed, the purpose of this being to prevent flow of fluid under pressure from chambers 14 and 16 past the check valve 39 to the brake pipe while fluid under pressure is being supplied to the vent valve piston chamber 84, so that the fluid under pressure in the chambers 14 and 16 may act to hold the vent valve 72 unseated, as above described, for the desired period of time.

When the fluid under pressure is vented from the emergency valve chamber 14 as just described, the slide valve 17 is maintained seated against the pressure of fluid in the brake cylinder 6 acting in cavity 69 by the emergency reservoir pressure in chamber 30 acting on the diaphragm 24 and through the rocking pin 27 on said slide valve. The slide valve 41 is also maintained seated at the same time by the emergency reservoir pressure acting in chamber 42, as will be evident.

When it is desired to effect a release of the brakes after an application fluid under pressure is supplied to the brake pipe 4 in the usual well known manner and flows from thence to the emergency piston chamber 11.

At the time a release of the brakes is initiated after a service application, the emergency piston 10 is already in the normal position in which case fluid under pressure merely equalizes from piston chamber 11 through the feed port 79 into the valve chamber 14 and quick action chamber 16.

However, in effecting a release of the brakes after an emergency application, at which time the valve chamber 14 and quick action chamber 16 are at substantially atmospheric pressure, th initial high pressure obtained in the brake pipe 4 and consequently in the emergency piston chamber 11 of the emergency valve device adjacent the locomotive of the train promptly establishes a sufficient differential of pressures on piston 10 to move said piston and thereby the slide valves 17 and 18 to a back dump position which is defined by engagement of said piston with a shoulder 86 formed on the casing. It will be noted that this high differential obtained on said piston causes said piston to first move the slide valve 17 from its right hand position to its normal position in which shoulder 59 on the piston stem 19 engages the plunger 57, and then said plunger is moved against the pressure of spring 58.

In the back dump position of slide valve 17, the cavity 69 connects the brake cylinder passage 96 to the back dump passage 62 and through this communication fluid under pressure from the brake cylinder 6 is permitted to flow to passage 62 and from thence past check valve 56 to chamber 69 and from said chamber through passages 63, 64, 65, 12, and 13 to the brake pipe 4. A sudden, local increase in brake pipe pressure is thereby obtained which is adapted to move the emergency valve device on the next car in the train to back dump position and thereby serially transmit back dump operation through the train for hastening the recharging of the brake pipe and consequently the releasing of the brakes on the train.

In the back dump position of the emergency valve device the charging port 79 is opened to piston chamber 11 which permits fluid under pressure to flow from said chamber to passage 15 and from thence to the valve chamber 14 and quick action chamber 16 thereby charging said chambers. When the pressure in chambers 14 and 16 is thus increased sufficiently, such pressure plus that of the spring 58 overcomes the opposing brake pipe pressure acting in chamber 11 on the piston 10 and moves said piston and the slide valves 17 and 18 towards the right hand until the plunger 57 engages shoulder 90 on the casing. This relieves the piston of the pressure of spring 58 so that said piston stops in this or the normal position in which the pressure of fluid in chambers 14 and 16 equalizes through port 79 with that in piston chamber 11.

If the chambers 14 and 16 tend to become charged to a pressure higher than that normally carried in the brake pipe, due for instance to the initial high pressure obtained in the brake pipe at the head end of the train being maintained for too long a period of time, the check valves 39 and 35 are operated as hereinbefore described to permit the relief of such excess pressure to the emergency reservoir 5.

When the emergency piston 10 moves the slide valve 17 to back dump position, the rocking pin 27 is thereby operated and shifts the slide valve 41 on its seat to a position slightly to the right of that shown, and in which the port 52 is adapted to connect passages 54 and 53 the same as in the normal position, and through this communication, fluid under pressure may flow from the brake pipe to the emergency reservoir 5 to aid in recharging same as hereinbefore described. When the slide valve 17 is returned to its normal position due to the action of spring 58, the slide valve 41 is also returned to its normal position, as will be evident.

It will be noted that the slide valve 41 controls only one communication. It normally opens this communication to permit the pressure of fluid in the emergency valve chamber 14 and quick action chamber 16 to reduce with brake pipe pressure when brake pipe pressure is reduced at a service rate, and closes this communication when the emergency piston 10 moves the slide valve 17 to the emergency position so that in emergency position, since there is no venting of fluid under pressure by flow through the port 52, the full amount of fluid under pressure in chambers 14 and 16 is available for holding the vent valve 72 unseated for the time desired. The slide valve 41 thus merely opens communication in the normal position of the main slide valve and closes it in the extreme right hand position of said main slide valve and it is not critical just when said communication is opened or closed with respect to the movement of said main slide valve.

It will therefore be evident that extreme accuracy in the manufacture of said slide valve 41 and the parts upon which its operation depends is not required such as now exists in the manufacture of slide valves 17 and 18 to obtain the proper timed registration of ports 70 and 67, opening of port 68 and operation of the plunger 22, as described in detail in the aforementioned Farmer application.

In order to modify the devices in use to incorporate the invention, it is only necessary to place plug 71 in port 70 in the auxiliary slide valve 18, drill passage 55 in the emergency valve casing, apply a new gasket having diaphragm portion 24 to which the new rocking pin 27 and extension 44 are secured, and apply the cover 25, cap 43 and slide valve 41, in place of the cover, gasket and rocking pin now in use, and it is submitted that such change in parts may be accomplished by a relatively unskilled workman.

It will now be evident that improved means, is provided for preventing undesired emergency operation of emergency valve devices upon a reduction in brake pipe pressure at a service rate and this improved means may readily be applied to emergency valve devices of the type disclosed in the aforementioned Farmer patent and will in no way interfere with or materially change the emergency operation of such devices upon an emergency reduction in brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, an emergency valve device comprising a piston subject to the opposing pressures of said brake pipe and a chamber normally charged with fluid under pressure, valve means operative by said piston upon a reduction in brake pipe pressure at an emergency rate to effect an emergency application of the brakes, a valve separate from said piston and normally establishing a communication from said chamber to said brake pipe through which the pressure of fluid in said chamber is adapted to reduce with that in said brake pipe upon a reduction in brake pipe pressure at a service rate, and means operative by the movement of said valve means to effect an application of the brakes to operate said valve to close said communication.

2. In a fluid pressure brake, in combination, a brake pipe, an emergency valve device comprising a piston subject to the opposing pressures of said brake pipe and a chamber normally charged with fluid under pressure, valve means operative by said piston upon a reduction in brake pipe pressure at an emergency rate to effect an emergency application of the brakes, a valve separate from said piston and normally establishing a communication from said chamber to said brake pipe through which the pressure of fluid in said chamber is adapted to reduce with that in said brake pipe upon a reduction in brake pipe pressure at a service rate, and an element operatively connecting said valve means with said valve for operating said valve to close said communication upon operation of said valve means to effect an emergency application of the brakes.

3. In a fluid pressure brake, in combination, a brake pipe, an emergency valve device comprising a piston subject to the opposing pressures of said brake pipe and a chamber normally charged with fluid under pressure, valve means operative by said piston upon a reduction in brake pipe pressure at an emergency rate to effect an emergency application of the brakes, a valve normally establishing a communication from said chamber to said brake pipe through which the pressure of fluid in said chamber is adapted to reduce with that in said brake pipe upon a reduction in brake pipe pressure at a service rate, and an element having one end connected to said valve means and the other end connected to said valve and having a fulcrum intermediate its ends for moving said valve to close said communication upon movement of said valve means to effect an application of the brakes.

4. In a fluid pressure brake, in combination, a brake pipe, an emergency valve device comprising a piston subject to the opposing pressures of said brake pipe and a chamber normally charged with fluid under pressure, valve means operative by said piston upon a reduction in brake pipe pressure at an emergency rate to effect an emergency application of the brakes, and to vent fluid under pressure from said chamber for effecting an emergency reduction in brake pipe pressure, a valve normally establishing a communication from said chamber to said brake pipe through which the pressure of fluid in said chamber is adapted to reduce with the pressure in said brake pipe upon a service rate of reduction in brake pipe pressure, a flexible diaphragm subject to the pressure in said chamber and an opposing pressure, an element interposed between one side of said diaphragm and said valve means and operative to transmit the opposing pressure acting on said diaphragm to said valve means for holding said valve means seated upon the venting of fluid under pressure from said chamber, and means operated by said element upon an emergency reduction in brake pipe pressure to operate said valve to close said communication.

5. In a fluid pressure brake, in combination, a brake pipe, an emergency valve device comprising a piston subject to the opposing pressures of said brake pipe and quick action chamber, a valve disposed in said valve device and normally establishing communication between said chamber and brake pipe through which the pressure of fluid in said chamber is adapted to reduce with that in said brake pipe upon a service rate of reduction in brake pipe pressure, said valve being operative by said piston to close said communication upon an emergency rate of reduction in brake pipe pressure, and valve means operative by said piston upon an emergency rate of reduction in brake pipe pressure to effect an emergency application of the brakes.

6. In a fluid pressure brake, in combination, a brake pipe, an emergency valve device comprising a piston subject to the opposing pressures of said brake pipe and quick action chamber, a main slide valve operative to effect an emergency application of the brakes, an auxiliary slide valve mounted on and movable relative to said main slide valve for effecting an emergency reduction in brake pipe pressure, said piston being operative upon an emergency reduction in brake pipe pressure to first operate said auxiliary slide valve and then said main slide valve, valve means normally establishing a communication through which the pressure of fluid in said chamber is adapted to reduce into said brake pipe at a service rate upon a service rate of reduction in brake pipe pressure, and means operative upon operation of said piston on an emergency reduction in brake pipe pressure to operate said valve means to close the communication controlled thereby.

7. In a fluid pressure brake, in combination, a brake pipe, an emergency valve device comprising a piston subject to the opposing pressures of the brake pipe and a chamber normally charged with fluid under pressure and valve means operated by said piston upon a sudden reduction in brake pipe pressure for effecting an emergency application of the brakes, means movable with said valve means for holding said valve means seated, and valve means operable by said holding means for controlling a communication through which fluid can flow from said chamber to the brake pipe.

8. In a fluid pressure brake, in combination, a brake pipe, a brake cylinder, an emergency reservoir normally charged with fluid under pressure, an emergency piston controlled by the opposing pressures of said brake pipe and a quick action chamber normally charged with fluid under pressure, a valve operative by said piston upon an emergency reduction in brake pipe pressure to supply fluid under pressure from said reservoir to said brake cylinder to effect an emergency application of the brakes, said emergency valve device having a normally open communication from said brake pipe to said emergency reservoir through which fluid under pressure is adapted to be supplied to said emergency reservoir, a check valve in said communication for preventing flow of fluid under pressure through said communication from said reservoir to said brake pipe, and means operative by said piston upon an emergency reduction in brake pipe pressure to close said communication.

9. In a fluid pressure brake, in combination, a brake pipe, a brake cylinder, an emergency reservoir normally charged with fluid under pressure, an emergency piston controlled by the opposing pressures of said brake pipe and a quick action chamber normally charged with fluid under pressure, a valve operative by said piston upon an emergency reduction in brake pipe pressure to supply fluid under pressure from said reservoir to said brake cylinder to effect an emergency application of the brakes, said emergency valve device having a normally open communication from said quick action chamber to said emergency reservoir through which fluid under pressure is adapted to flow from said chamber to said reservoir, a pair of serially arranged check valves in said communication, said emergency valve device having another communication normally connecting the brake pipe to a chamber intermediate said check valves through which chamber fluid under pressure is adapted to flow at one time from said brake pipe to said reservoir and at another time from said quick action chamber to said brake pipe for reducing the pressure of fluid in said quick action chamber at a service rate upon a service rate of reduction in brake pipe pressure, and valve means operated by said piston upon an emergency reduction in brake pipe pressure to close the communication from the brake pipe to the chamber between said check valves.

10. In a fluid pressure brake, in combination, a brake pipe, a brake cylinder, an emergency reservoir normally charged with fluid under pressure, an emergency piston controlled by the opposing pressures of said brake pipe and a quick action chamber normally charged with fluid under pressure, a valve operative by said piston upon an emergency reduction in brake pipe pressure to supply fluid under pressure from said reservoir to said brake cylinder to effect an emergency application of the brakes, said emergency valve device having a normally open communication from said quick action chamber to said emergency reservoir through which fluid under pressure is adapted to flow from said chamber to reservoir, a pair of serially arranged check valves in said communication, said emergency valve device having another communication normally connecting the brake pipe to a chamber intermediate said check valves through which chamber fluid under pressure is adapted to flow at one time from said brake pipe to said reservoir and at another time from said quick action chamber to said brake pipe for reducing the pressure of fluid in said quick action chamber at a service rate upon a service rate of reduction in brake pipe pressure, a valve controlling the communication between said brake pipe and the chamber between said check valves and having a normal position in which the communication is open and operative by said piston to close the communication upon an emergency reduction in brake pipe pressure, and a choke in the communication between said brake pipe and the chamber between said check valves operative to limit the rate of reduction in pressure in said quick action chamber to a service rate upon a service rate of reduction in brake pipe pressure, and for limiting the flow of fluid under pressure in the reverse direction upon an increase in brake pipe pressure in order to prevent the pressure in the chamber between said check valve from increasing to a degree exceeding substantially that in said emergency reservoir.

11. In a fluid pressure brake, in combination, a brake pipe, a brake cylinder, an emergency reservoir normally charged with fluid under pressure, a piston controlled by the opposing pressures of said brake pipe and a quick action chamber normally charged with fluid under pressure, a slide valve movable by said piston to an emergency position upon a reduction in brake pipe pressure at an emergency rate to establish a communication through which fluid under pressure is vented from said chamber to effect sudden venting of fluid under pressure from said brake pipe and to establish another communication through which fluid under pressure is supplied from said emergency reservoir to said brake cylinder to effect an emergency application of the brakes, a flexible diaphragm subject on one face to the pressure of fluid in said chamber and on the opposite face to the pressure of fluid in said emergency reservoir, an element having one end connected to and movable with said slide valve and the other end engaging the chamber face of said diaphragm for transmitting to said slide valve the force of emergency reservoir pressure acting on the opposite face of said diaphragm upon the venting of fluid under pressure from said chamber, a valve normally connecting said chamber to said brake pipe through a port which is restricted to permit the pressure in said chamber to reduce to said brake pipe at a service rate upon a service rate of reduction in brake pipe pressure, and means connecting said element to said valve for operating said valve to close the communication from said chamber to said brake pipe upon operation of said valve means upon an emergency reduction in brake pipe pressure.

12. In a fluid pressure brake, in combination, a brake pipe, a brake cylinder, an emergency reservoir normally charged with fluid under pressure, a piston controlled by the opposing pressures of said brake pipe and a quick action chamber normally charged with fluid under pressure, a slide valve movable by said piston to an emergency position upon a reduction in brake pipe pressure at an emergency rate to establish a communication through which fluid under pressure is vented from said chamber to effect sudden venting of fluid under pressure from said brake pipe and to establish another communication through which fluid under pressure is supplied from said emergency reservoir to said brake cylinder to effect an emergency application of the brakes, a flexible diaphragm subject on one face to the pressure of fluid in said chamber and on the opposite face to the pressure of fluid in said emergency reservoir, an element having one end connected to and movable with said slide valve and the other end engaging the chamber face of said diaphragm for transmitting to said slide valve the force of emergency reservoir pressure acting on the opposite face of said diaphragm upon the venting of fluid under pressure from said chamber, another slide valve contained in a chamber in constant communication with said emergency reservoir and normally establishing a communication from said quick action chamber to said brake pipe through which the pressure of fluid in said quick action chamber is adapted to reduce into said brake pipe at a service rate upon a service rate of reduction in brake pipe pressure, a member secured to said element and projecting from the emergency reservoir face of said diaphragm and operatively engaging said other slide valve for operating the other slide valve to close communication between said quick action chamber and brake pipe upon operation of said element by the first mentioned slide valve upon an emergency reduction in brake pipe pressure.

13. In a fluid pressure brake, in combination, a brake pipe, a brake cylinder, an emergency valve device comprising an emergency piston subject to the opposing pressures of said brake pipe and a quick action chamber, valve means having a normal position and movable by said piston from said normal position to an emergency position upon an emergency reduction in brake pipe pressure to supply fluid under pressure to said brake cylinder to effect an emergency application of the brakes, said valve means being movable upon an increase in brake pipe pressure after an emergency application of the brakes to a back dump position for establishing a communication through which fluid under pressure is vented from said brake cylinder into said brake pipe, a check valve in said communication, a valve normally connecting said quick action chamber to said communication on the brake pipe side of said check valve and operative upon operation of said valve means upon an emergency reduction in brake pipe pressure to disconnect said quick action chamber from said communication, a choke in the connection between said quick action chamber and communication for limiting flow of fluid under pressure from said quick action chamber to said brake pipe to a service rate upon a service rate of reduction in brake pipe pressure, and a check valve for preventing flow of fluid from said communication to said quick action chamber.

14. In a fluid pressure brake, in combination, a brake pipe, an emergency valve device comprising a piston subject to the opposing pressures of said brake pipe and a chamber, two slide valves movable simultaneously and having a normal position in which a communication is established through one slide valve from said chamber to said brake pipe through which the pressure of fluid in said chamber is adapted to reduce into said brake pipe at a service rate upon a service rate of reduction in brake pipe pressure, said slide valves being movable from said normal position to another position in which the one slide valve closes said communication and the other slide valve opens a vent communication to said chamber and establishes another communication through which an emergency application of the brakes is effected, said piston being operating upon an emergency rate of reduction in brake pipe pressure to move one of said slide valves from its normal position to its other position, and means connecting said slide valves together whereby when the one slide valve is moved by said piston the other is also moved.

15. In a fluid pressure brake, the combination with a brake pipe, and an emergency valve device comprising a casing containing a piston subject to the opposing pressures of said brake pipe and a quick action chamber, and valve means operative by said piston upon an emergency reduction in brake pipe pressure to effect an emergency application of the brakes, said casing having a gasket face, a communication open at said face and leading to the brake pipe, another communication open at said face and leading to said quick action chamber and a check valve in the last mentioned communication for preventing flow of fluid under pressure to said quick action chamber, of a gasket adapted to be applied to said gasket face, a removable cover adapted to be applied to said gasket, a slide valve mounted in said cover and having a port normally connecting two passages one of which registers with one of said communications in the casing and the other of which registers with the other communication, these communications, passages and port forming a normally open conduit from said quick action chamber to said brake pipe through which the pressure of fluid in said quick action chamber is adapted to reduce with the brake pipe pressure upon a service rate of reduction in brake pipe pressure, and means carried by said gasket and having one end extending through an opening in said casing and operatively connected to said valve means and having another end operatively connected to said slide valve for moving said slide valve with said valve means to thereby close communication between said passages through said port when said valve means is operated to effect an emergency application of the brakes.

16. In a fluid pressure brake, the combination with a brake pipe, and an emergency valve device comprising a casing containing a piston subject to the opposing pressures of said brake pipe and a valve chamber in constant communication with a quick action chamber, valve means in said valve chamber movable by said piston upon an emergency reduction in brake pipe pressure to a position for effecting an emergency application of the brakes, said casing having a gasket face, a bore open at said face and leading to said valve chamber, a passageway open at said face and leading to said brake pipe and another passageway open at said face and leading to said quick action chamber, and a check valve in the casing to prevent flow of fluid under pressure through the last mentioned passageway to said quick action chamber, a gasket applied to said gasket face and having a flexible diaphragm portion covering said bore, a cover secured against said gasket to said casing, a slide valve in said cover having a port normally connecting two passages one of which registers with one of said passageways and the other of which registers with the other passageway thereby normally establishing a communication through which fluid under pressure is adapted to flow from said valve chamber and quick action chamber to said brake pipe at a service rate upon a service rate of reduction in brake pipe pressure, said slide valve being movable from the normal position to another position upon an emergency reduction in brake pipe pressure, for closing communication between said passageways and means for effecting such movement of said slide valve comprising a rocking pin having one end connected to and movable with said valve means and the other end connected to one face of said diaphragm, and an element mounted against the opposite face of said diaphragm and connected to said rocking pin so as to move therewith and also operatively connected to said slide valve whereby movement of said valve means upon an emergency reduction in brake pipe pressure moves said slide valve to the position for closing communication between said passageways.

17. In a fluid pressure brake, the combination with a brake pipe, and an emergency valve device comprising a casing containing a piston subject to the opposing pressures of said brake pipe and a quick action chamber, and valve means operative by said piston upon an emergency reduction in brake pipe pressure to effect an emergency application of the brakes, said casing having a gasket face, a communication open at said face and leading to the brake pipe, another communication open at said face and leading to said quick action chamber and a check valve in the last mentioned communication for preventing flow of fluid under pressure to said quick action chamber, of a gasket adapted to be applied to said gasket face, a removable cover adapted to be applied to said gasket, a slide valve mounted in said cover and having a port normally connecting two passages one of which registers with one of said communications in the casing and the other of which registers with the other communication, these communications, passages and port forming a normally open conduit from said quick action chamber to said brake pipe through which the pressure of fluid in said quick action chamber is adapted to reduce with the brake pipe pressure upon a service rate of reduction in brake pipe pressure, and means carried by said gasket and having one end extending through an opening in said casing and operatively connected to said valve means and having another end operatively connected to said slide valve for moving said slide valve with said valve means to thereby close communication between said passages through said port when said valve means is operated to effect an emergency application of the brakes, said valve means having service ports adapted to function upon movement thereof from normal position towards emergency position to vent fluid under pressure from said valve and quick action chambers at a service rate, and a plug in one of said ports for rendering said service ports ineffective.

JOHN N. GOOD.